US009769668B1

(12) United States Patent
Cui et al.

(10) Patent No.: US 9,769,668 B1
(45) Date of Patent: Sep. 19, 2017

(54) SYSTEM AND METHOD FOR COMMON AUTHENTICATION ACROSS SUBSCRIBED SERVICES

(71) Applicant: AT&T INTELLECTUAL PROPERTY I, L.P., Atlanta, GA (US)

(72) Inventors: Zhi Cui, Sugar Hill, GA (US); Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/225,207

(22) Filed: Aug. 1, 2016

(51) Int. Cl.
  *H04M 11/00* (2006.01)
  *H04W 12/08* (2009.01)
  *H04W 4/24* (2009.01)
  *H04W 12/06* (2009.01)

(52) U.S. Cl.
  CPC ............. *H04W 12/08* (2013.01); *H04W 4/24* (2013.01); *H04W 12/06* (2013.01)

(58) Field of Classification Search
  CPC ........ H04W 12/08; H04W 12/06; H04W 4/24
  See application file for complete search history.

(56) References Cited

U.S. PATENT DOCUMENTS

| 7,206,301 | B2 | 4/2007 | Wu et al. |
| 7,562,393 | B2 | 7/2009 | Buddhikot et al. |
| 7,954,141 | B2 | 5/2011 | De Lutiis et al. |
| 8,166,524 | B2 | 4/2012 | Sentinelli |
| 8,280,351 | B1 | 10/2012 | Ahmed et al. |
| 8,341,700 | B2 * | 12/2012 | Malinen .................. H04L 63/08 380/247 |

(Continued)

FOREIGN PATENT DOCUMENTS

| KR | 100953092 B1 | 4/2010 |
| WO | 0172009 A2 | 9/2001 |
| WO | 2013065037 A1 | 5/2013 |

OTHER PUBLICATIONS

""HIPAA/HITECH Compliant Cloud"", http://web.archive.org/web/20160324041240/https://www.panterranetworks.com/our_cloud/security.php, Discloses secure cloud services functionality with single sign on authentication for services., 2016.

(Continued)

*Primary Examiner* — Ajit Patel
(74) *Attorney, Agent, or Firm* — Guntin & Gust, PLC; Joseph Hrutka

(57) ABSTRACT

Aspects of the subject disclosure may include, for example, determining a credential of a first subscribed service, responsive to authentication of a user device within a first communication network. Authentication of the user with respect to the first service is facilitated and, in response, a second subscribed service is identified. A notification is provided to an access control function that the user device is granted access to the second subscribed service. The credential is stored in a common authentication repository accessible by the first and second subscribed services. An inquiry from a second communication network is determined in response to the user device requesting authentication there. A second notification is provided to the second communication network that the user device has already been authenticated, allowing the user device to access the services without further authentication. Other embodiments are disclosed.

20 Claims, 9 Drawing Sheets

(56) References Cited

U.S. PATENT DOCUMENTS

| | | | |
|---|---|---|---|
| 8,528,065 | B2 | 9/2013 | Ramos Robles et al. |
| 8,544,072 | B1 | 9/2013 | Masone et al. |
| 8,756,659 | B2 | 6/2014 | Ruckart et al. |
| 8,806,587 | B2 | 8/2014 | Frelechoux et al. |
| 8,955,080 | B2 | 2/2015 | Herter et al. |
| 8,959,598 | B2 | 2/2015 | Smith |
| 9,077,544 | B2 | 7/2015 | Baker et al. |
| 9,264,900 | B2 | 2/2016 | Sun et al. |
| 2003/0196107 | A1 | 10/2003 | Robertson et al. |
| 2005/0096048 | A1 | 5/2005 | Clare et al. |
| 2006/0069914 | A1 | 3/2006 | Rupp et al. |
| 2006/0195893 | A1 | 8/2006 | Caceres et al. |
| 2007/0118879 | A1 | 5/2007 | Yeun et al. |
| 2007/0184819 | A1 | 8/2007 | Barriga-Caceres et al. |
| 2007/0207818 | A1* | 9/2007 | Rosenberg ........... G06Q 20/102 455/461 |
| 2009/0217048 | A1* | 8/2009 | Smith ................ H04L 63/06 713/176 |
| 2010/0188975 | A1* | 7/2010 | Raleigh ........... G06Q 10/06375 370/230.1 |
| 2014/0181520 | A1 | 6/2014 | Wendling et al. |
| 2014/0189839 | A1 | 7/2014 | Jezek et al. |
| 2014/0310785 | A1* | 10/2014 | Prabdial ................ H04W 8/183 726/5 |
| 2015/0081876 | A1 | 3/2015 | Pieczul et al. |
| 2015/0341338 | A1 | 11/2015 | Zmener |
| 2016/0127902 | A1* | 5/2016 | Ciarniello ........... H04L 63/0838 380/247 |

OTHER PUBLICATIONS

""The transformation from application delivery to service delivery"", http://web.archive.org/web/20140122164601/http://www.citrix.com/content/dam/citrix/en_us/documents/products-solutions/the-transformation-from-application-delivery-to-service-delivery.pdf, Discloses the "OpenCloud Access" application "for extending the identity of internal users into a service provider's domain. With OpenCloud Access users also benefit from a seamless and consistent access experience, single sign-on.", 2011.

Dan, Griffin , ""Cloud Security: Safely Sharing IT Solutions"", https://technet.microsoft.com/en-us/magazine/gg296364.aspx, Discloses IT solutions and architectures across the cloud and a Centralized Application Management where "All authorization claims and authentication identity need to be shared by all resources, whether local or cloud-based.", 2010.

Hakobyan, Davit , ""Authentication and Authorization Systems in Cloud Environments"", http://www.diva-portal.org/smash/get/diva2:557150/FULLTEXT01.pdf, Section "3. Security System Architecture for Cloud Environments" "describes the architecture of a cloud security system, which is designed for delivering authentication and authorization services to cloud-based application service providers.", 2012.

Joshi, James et al., ""Access-Control Language for Multidomain Environments"", http://www.sis.pitt.edu/jjoshi/XML_IEEEIC04.pdf, Discloses the X-RBAC, an Access-Control Language for Multi-Domain Environments, and an architecture with inheritance for allowing users authenticated with one application to use other applications., 2004.

Sheikh, Shah , ""Does Your Cloud Have a Secure Lining?"", http://www.isaca.org/Journal/archives/2013/Volume-5/Pages/JOnline-Does-Your-Cloud-Have-a-Secure-Lining.aspx, Discusses "the ultimate goal of identity federation is to enable users of one domain to securely access data or systems of another domain seamlessly, without requiring redundant user administration.", 2013.

* cited by examiner

100

200

450

SYSTEM AND METHOD FOR COMMON AUTHENTICATION ACROSS SUBSCRIBED SERVICES

FIELD OF THE DISCLOSURE

The subject disclosure relates to a system and method for common authentication across subscribed services.

BACKGROUND

Subscribers to digital services often access their services through mobile devices. An authentication process is generally necessary to authenticate a subscriber before authorizing access to any subscribed services. In some instances, authentication can be accomplished by or in association with an authentication process of the mobile access network, such as accomplished in a 3G or LTE network.

It is common for mobile devices to move one type of communication network to another, for example from a 3G or LTE network (mobility network) to a Wi-Fi network. Each movement to a different communication network typically requires that an authentication procedure be performed using the mobile device on that communication network.

By way of example, authentication of a mobile cellular subscriber moving to a Wi-Fi access network can include an authentication request sent from the mobile device to a WiFi Access Point (AP). The authorization request is forwarded from the AP to a Trusted Wireless access point AAA Proxy (TWAP) and from there to a Consolidated Network Repository (CNR), to allow for authentication of the subscriber and/or the subscriber device. Upon authentication, the CNR pushes authenticated subscriber credentials back to TWAP, then to the AP, and finally to the mobile device. A similar process may be necessary with each transition of the same subscriber and/or subscriber device to an alternative access network.

BRIEF DESCRIPTION OF THE DRAWINGS

Reference will now be made to the accompanying drawings, which are not necessarily drawn to scale, and wherein.

DETAILED DESCRIPTION

Figure 1:
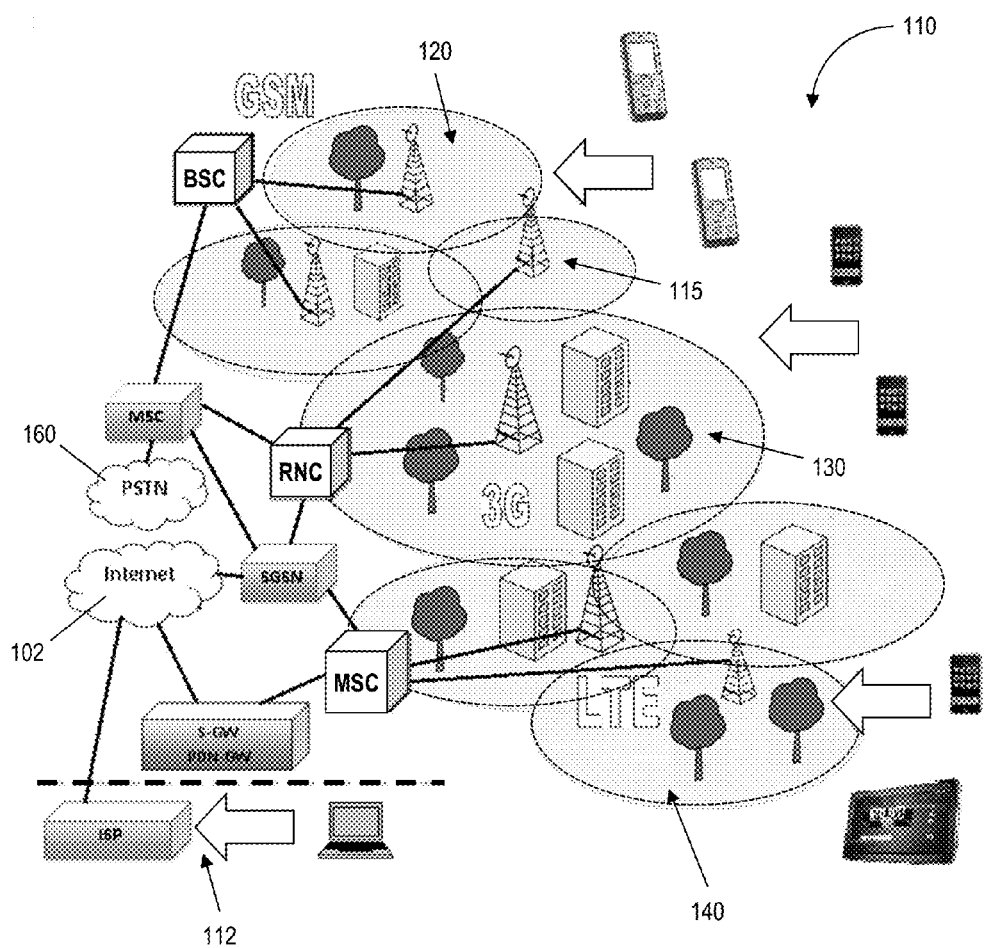
FIG. 1 depicts an illustrative embodiment of an architecture for a cellular network for interacting with mobile communication devices.

The subject disclosure describes, among other things, illustrative embodiments for a common authentication across subscribed service for a communication device accessing different communication networks (e.g., a mobility network and a Wi-Fi network). Other embodiments are described in the subject disclosure.

One or more aspects of the subject disclosure include storing authentication credentials for a communication device authenticated within a first network, determining that other subscribed services are available, and automatically pushing the authentication credentials to a repository that authorizes all subscribed services without further authentication. This permits the communication device moving from the first network to a second network to be authenticated for all services within the second network without the need for further authentication.

One or more aspects of the subject disclosure include a process that receives a credential associated with the device, responsive to authentication associated with a user device within a first communication network. The credential corresponds to a first service to which the user is subscribed. Authentication associated with the user device is initiated with respect to the first service to obtain a first authentication. A second service to which the user is subscribed is identified in response to the first authentication. A first notification is forwarded to an access control function of the second service that the user device is granted user access. The credential is stored, thereby providing a common authentication repository for a number of services that includes the first and second services. In response to the user device requesting authentication within a second communication network, an inquiry is received from the second communication network regarding authentication of the user device within the second communication network. A second notification is transmitted to the second communication network that the user device has been authenticated within the first communication network, whereby the second communication network provides the user device with access to the number of services without further being required. The user device accesses one or more of the services responsive to an acknowledgement from the second communication network that the user device has been authenticated to the second communication network.

One or more aspects of the subject disclosure include a processing system having a processor and a memory that stores executable instructions. The instructions, when executed by the processing system, facilitate performance of operations that include determining a credential associated with the user device, responsive to authentication associated with a user device within a first communication network. The credential corresponds to a first service to which the user is subscribed. Authentication of the user device is facilitated with respect to the first service to obtain a first authentication. A second service to which the user is subscribed is identified in response to the first authentication. A first notification is provided to an access control function of the second service, indicating that the user device is granted user access. The credential is stored, thereby providing a common authentication repository for a number of services including the first and second services. In response to the user device requesting authentication within a second communication network, an inquiry is determined from the second communication network regarding authentication of the user device within the second communication network. A second notification is provided to the second communication network that the user device has been authenticated within the first communication network, whereby the second communication network provides the user device with access to the services without further authentication being required. The user device accesses the services responsive to an acknowledgement from the second communication network that the user device has been authenticated to the second communication network.

A machine-readable storage medium includes executable instructions that, when executed by a processing system including a processor, facilitate performance of operations. The operations include determining a credential associated with the user device, responsive to authentication associated with a user device within a first communication network. The credential corresponds to a first service to which the user is subscribed. Authentication of the user device with respect to the first service is facilitated to obtain a first authentication. A second service to which the user is subscribed is determined in response to the first authentication. A first notification is provided to an access control function of the second service that the user device is granted user access. Storage of the credential is facilitated, thereby providing a common authentication repository services including the first and second services. An inquiry is determined in response to the user device requesting authentication within a second communication network. The inquiry is from the second communication network regarding authentication of the user device within the second communication network. A second notification is provided to the second communication network that the user device has been authenticated within the first communication network. The second communication network provides the user device with access to the services without further authentication. The user device accesses the services responsive to an acknowledgement from the second communication network that the user device has been authenticated to the second communication network.

FIG. 1 schematically illustrates an architecture 100 for wireless communication networks with different (typically overlapping) regions of coverage. Mobile devices 110 with a variety of technologies (phones, tablets, latptops, gaming devices, such as gaming controllers and/or consoles, etc.) have an end-to-end connection established with either the Public Switched Telephone Network (PSTN) 160, in the case of voice traffic, or an internet protocol network (Internet) 102, in the case of data traffic. The architecture 100 can include a GSM network 120, a 3G network 130, and/or an LTE network 140. In particular, $3^{rd}$ Generation Partnership Protocol (3GPP) LTE specifications, e.g., Rel. 13, define an all-internet protocol architecture with voice over internet protocol (VoIP). FIG. 1 also illustrates a device accessing the network through an Internet Service Provider (ISP) broadband connection 112. The GSM network 120, the 3G network 130 and the LTE network 140 are referred to herein generally as mobility networks.

Figure 2:
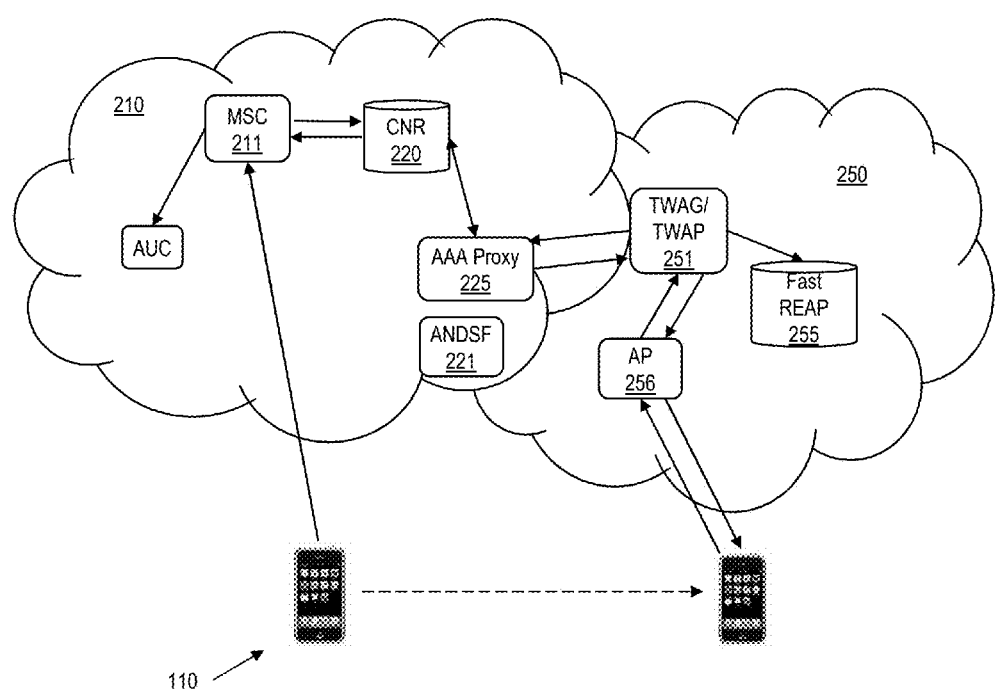
FIG. 2 depicts an illustrative embodiment of a communication system providing authentication in wireless networks.

FIG. 2 schematically illustrates a communication system 200 in which a mobile communication device 110 of a subscriber is authenticated to a mobility network 210, and then moves to a region covered by a Wi-Fi network 250. In order to access the mobility network, the device 110 transmits an authentication request to mobile switching center (MSC) 211, which forwards the request to consolidated network repository (CNR) 220. The CNR 220 has stored therein the authentication credentials for the subscriber, and performs the authentication procedure. However, when the device 110 changes location so that communication via the Wi-Fi network 250 is desired, the device 110 must be authenticated to the Wi-Fi network 250. A new authentication request from device 110, accessing the network 250 at the Wi-Fi access point (AP) 256, is sent to the Trusted WAN Access Gateway/Proxy (TWAG/TWAP) 251. In this example, the subscriber credentials are not available to the TWAG/TWAP 251 on the Wi-Fi network 250. The TWAG/TWAP 251 therefore must communicate back to the mobility network 210, via the Authentication Authorization Accounting (AAA) proxy 225 of the mobility network 210, to transmit the Wi-Fi authentication request to the CNR 220. The CNR 220 then performs a new authentication procedure, the results of which are transmitted through AAA proxy 225 to the TWAG/TWAP 251.

Figure 3:
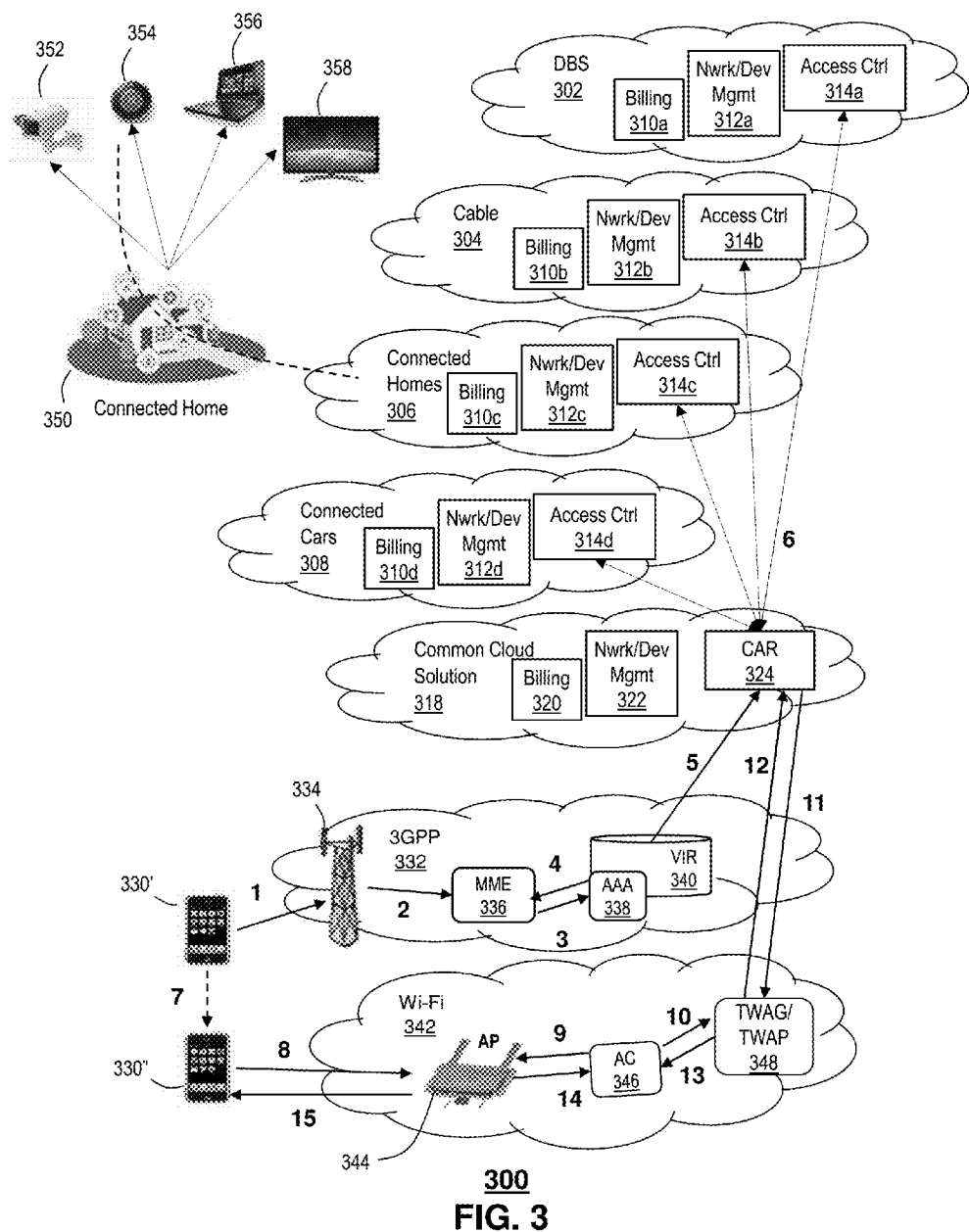
FIG. 3 depicts an illustrative embodiment of a communication system providing a common authentication that allows a mobile device to access multiple subscribed services without further authentication, while moving between different wireless networks.

FIG. 3 depicts an illustrative embodiment of a communication system providing a common authentication that allows a mobile device to access multiple subscribed services without further authentication, while moving between different wireless networks. The illustrative system provides a number of different services available to users on a subscription basis. The services include, without limitation, a direct broadcast satellite (DBS) service 302, a cable access service 304, a connected homes service 306, and a connected cars service 308. At least some of the services, such as DBS 302 and cable 304, can provide digital content to user equipment, e.g., in a form of streaming media available according to a pre-programmed schedule or electronic programming guide and/or on-demand according to a media catalog. Other services, such as the connected homes 306 and connected cars 308 allow user equipment to access to and/or control devices and/or systems in a home and/or automobile.

In the illustrative example, a connected home 350 includes video monitoring equipment 352, e.g., as part of a security system that allows a remote subscriber to monitor areas of their home from any internet accessible location. The connected home 350 can include other devices, such as a smart thermostat 354, a digital video recorder (DVR), a smart television 358, a computer and/or file storage server 356, and the like.

Continuing with the illustrative example, a subscriber can access one or more of the services by way of a mobile device, such as a tablet device and/or a mobile phone 330'. The mobile phone 330' can access a wireless network, such as a 3GPP mobile cellular network 332. For example, upon attachment to the cellular network 332, the mobile phone 330' requests authentication. A base station, e.g., and eNode B (eNB) 334 receives the request and sends it to a mobility core network element, such as a mobility management entity (MME) 336 in an LTE network. The MME 336, in turn, communicates with an authentication system, such as the Authentication, Authorization and Accounting (AAA) system 338 in a Virtual Intelligent Repository (VIR) 340 for authentication. In some embodiments, the AAA system 338 uses a Diameter protocol, providing security architecture that is well suited for distributed systems. The authentication architecture including the AAA system 338 facilitates control of which users are allowed access to which services, and tracking which resources they have used. Without limitation, two network protocols providing this functionality include the RADIUS protocol, and its Diameter counterpart.

The AAA system 338 confirms the user and/or device credential and sends a message back to the MME 336 confirming the same. To the extent that the user and/or device is not authenticated, the AAA system 338 can generate an authentication failure notification, sending the same to the MME 336 to deny access to any service(s) that have not been authenticated and authorized.

A AAA server generally provides a network service that applications and/or services use to authenticate credentials, e.g., account names and passwords, of their users or subscribers. When a client submits a valid set of credentials, it receives an authorization, e.g., in the form of a cryptographic ticket, that it can subsequently use to access various subscribed services.

Credentials can include common credentials that apply to multiple services, e.g., a common account name, password and the like. Alternatively or in addition, credentials can include different credentials that might apply to one subscribed service and not to another subscribed service of the same subscriber. Such distinguishing credentials can be gathered and/or retained by the CAR 324. Accordingly, a subscriber that is authenticated for one service can be authenticated for other services, even though their credentials may differ according to the different services. For example, the CAR 324 can store or otherwise access an association of the subscriber, subscribed services and credentials associated with the particular subscribed services.

Authentication, e.g., based on the credentials, can be used as a basis for authorization. Authorization can refer to a determination whether a privilege is granted to a particular subscriber, service or process. Privacy can be applied to one or more aspects of the AAA process to prevent information from becoming known to non-participants, and non-repudiation, which is the inability to deny having done something that was authorized to be done based on the authentication.

The AAA system 338 checks with a User Data Repository (UDR), e.g., the VIR 340, to identify any and/or all other services the user has subscribed. Having identified the subscribed services, the AAA system 338 sends a message that includes authentication credentials, e.g., "pushes" the corresponding authentication credentials to a Common Authentication Repository (CAR) 324.

Each of the services is illustrated as a service cloud. The service cloud can represent network resources allocated to the particular service. The network elements can be real physical elements, such as servers, gateways, processors and the like. Alternatively or in addition, the network elements can include virtual network elements, e.g., according to a software defined network. For the illustrative subscription-based services, each of the service clouds 302, 304, 306, 308 can include one or more of an access control element 314a, 314b, 314c, 314d, generally 314. Likewise, each of the service clouds 302, 304, 306, 308 can include one or more of an network and/or device manager 312a, 312b, 312c, 312d, generally 312, and/or an accounting or billing system 310a, 310b, 310c, 310d, generally 310.

In existing service architectures that use service clouds, such as those illustrated in FIG. 3, separate authentication is performed between the user equipment and/or the access network and each of the service clouds 302, 304, 306, 308. This can represent a significant volume of network traffic, particularly in the access network where bandwidth can be limited based on wireless frequency assignments and other traffic. Beneficially, the CAR 324, having received authentication credentials, can facilitate authorization to each of the other service clouds 302, 304, 306, 308, without imposing further authentication network traffic in the access network.

The example system 300 includes a common network service architecture 318 that facilitates authentication, accounting and/or authorization, of the user and/or user equipment, e.g., the mobile phone 330' with respect to a group of subscribed services. In the illustrative example, the common network service architecture is referred to as a common cloud solution 318. It is understood that network elements of the common cloud solution 318 can include one or more of physical elements, such as servers, gateways, processors and the like, and/or virtual network elements, e.g., according to a software defined network architecture.

The example common cloud solution 318 includes the CAR 324 and one or more of a network and/or device manager 322 and a billing system 320. The cloud can be operated and/or otherwise managed by and/or for a service provider. Many service providers offer multiple services, allowing subscribers to pick and choose which services they subscribe to. Beneficially, the common cloud solution 318 provides a common authentication/authorization infrastructure and/or a common accounting and/or billing infrastructure that can service one or more of the subscribed services. Such common tracking facilitates tracking of service access, data usage, times of access, and the like, for the services individually and/or collectively.

In some embodiments, the billing system 320 operates in a coordinated manner with the billing systems 310 of one or more of the subscribed service clouds 302, 304, 306, 308. For example, the individual billing systems 310 of the service clouds can track access to their respective subscribed services. The billing system 320 of the common cloud solution 318 can transfer information with each of the individual billing systems 310. Business rules can be applied at one or more of the individual billing systems 310 and the common billing system 320 to aggregated and/or combined accounting and/or billing information. For example, rates applied to one service can be based on activity, e.g., access and/or usage, in another service. Such flexibility can allow a service provider to offer special rates, discounts and the like, based on a comprehensive understanding of the subscriber's usage of the subscribed services.

Likewise, in some embodiments, the network and/or device manager 322 operates in a coordinated manner with the network and/or device manager 312 of one or more of the subscribed service clouds 302, 304, 306, 308. For example, the individual network and/or device managers 310 of the service clouds can track access to their respective subscribed services. The common network and/or device manager 322 can transfer information with each of the individual network and/or device managers 310. Business rules can be applied at one or more of the individual network and/or device managers 310 and the common network and/or device manager 322 to aggregated and/or combined management of network resources and/or user devices. For example, access to one service can be based on activity, e.g., access and/or usage, in another service. Such flexibility can allow a service provider to offer special rates, discounts and the like, based on a comprehensive understanding of the subscriber's usage of the subscribed services. For example, premium rates and/or discounts may apply to a user accessing multiple services simultaneously. Alternatively or in addition, access to one or more of the subscribed services can be managed according to access and/or usage of another service.

In the illustrative embodiment, the CAR 324 informs the access grant to the access controllers 314 of all the service clouds to which the particular user and/or device has subscribed. Accordingly, the CAR 324 and or some other element of the common cloud solution 318 can identify all of the subscribed services available to a particular user and/or device.

Continuing with the example, the mobile phone 303' having registered within the 3GPP network 332 as disclosed above, transitions to another access network. For example, the mobile phone 330" is handed off or moves to another location having IEEE 802.11, e.g., Wi-Fi wireless access. This might include a subscriber who has moved to a Wi-Fi coverage area away from their residence. The subscriber may choose to access their connected home service, e.g., Digital Life® home service to check a status of their home security system and/or access data from home monitors. (Digital Life® is a registered trademark of AT&T).

Upon entering the Wi-Fi coverage area 342, the mobile phone 330" requests authentication. In at least some embodiments, the WiFi coverage area is operated by the same service provider. The WiFi coverage area 342 includes a Wireless Access Point (WAP) 344, such as a wireless modem 344. The WiFi access service can include a Wireless Access Controller (WAC) 346 and/or a Trusted WAN AAA Gateway (TWAG) and/or a TWAP 348.

In association with the access request, information is sent from WAP 344 to WAC 346. The WAC 346, in turn, sends information associated with the request to the TWAP 348. The TWAP 348 consults the CAR 324 of the common cloud solution 318 to determine whether any credentials are already available for the requesting subscriber and/or user equipment. To the extent that credentials are available, related information is retrieved by the TWAP 348 from the CAR 324. In response to obtaining the appropriate credentials, an acknowledgment is sent from the TWAP 348 to the WAC 346. The WAC forwards the acknowledgment further down to the WAP 344, which, in turn, provides the mobile phone 330" with an acknowledgement (ACK) that authentication has been accomplished successfully, allowing the user and/or user device to access one or more of the subscribed services. The mobile phone 330" receives the ACK and ready to function in Wi-Fi network. In particular, the subscriber has gained the access to all of the services subscribed to without further authentication from each service cloud 302, 304, 306, 308. Once again, authentication and access is accomplished without requiring any exchange of messages with the individual service clouds 302, 304, 306, 308.

It is understood that the mobile user may have initially authenticated by way of the WiFi access network 342. In this instance, the initial authentication is performed by way of the WiFi network 342, for some or all of the subscribed services, e.g., providing credentials to the CAR 324. Should the subscriber move or otherwise transfer to another access network, such as the 3GPP cellular network 322, the AAA system 338 alone or in combination with the VIR 340 consults the CAR 324 to determine whether the user and/or mobile device has already been authenticated, if so, a suitable notification is returned to the mobile device by way of the 3GPP network 322, authorizing access to multiple subscribed services, without requiring additional network traffic that would otherwise be associated with individual authentications/authorizations for each of the individual subscribed services.

Similar approaches can be applied to other access technologies, without restriction. For example, a similar process can be applied when one of the access technologies includes a wireline access, e.g., cable, DSL, and the like. Beneficially, the approach can reduce wireless as well as wireline message traffic that would otherwise be associated with individual authentications/authorizations for each of the individual subscribed services.

According to any of the foregoing example, a similar, should it be determined that a user and/or user device has not already been authorized/authenticated, a similar authorization process can be applied using the available access network. Consider a user accessing one group of services from one provider who transitions to an access network of another service provider. To the extent the subscriber has subscribed to services of both service providers, an authentication with one service provider may not be complete for both. Accordingly, a similar authentication process can be applied for subscribed services of one service provider when a subscriber first authenticates with that service provider. The process can be repeated when the subscriber first authenticates with the other service provider.

In some embodiments, it is understood that agreements can be reached between service providers to allow for a sharing or common authentication to subscribed services offered by more than one service provider. In such instances, the network and/or device manager 322 and/or billing system 320 can include multiple business rules that might apply differently based on the particular service arrangements. Alternatively or in addition, a third party can operate the common cloud solution providing joint authentication for subscribed services of more than one service provider.

Although the illustrative example relates to personal systems, such as the connected home, it is understood that the techniques disclosed herein can apply to other scenarios, such as business and/or enterprise applications. For example, a business with a fleet of vehicles can used a connected cars 308 service to monitor status and/or control certain features of fleet vehicles. Without limitation, the services can include other applications, such as the Internet of Things (IoT).

It is understood that in at least some embodiments, a time limit can be associated with a particular authentication/authorization. For example, credentials can be retained at the CAR 324 for a particular time period based on a predetermined value. The time period can be imposed by the common cloud solution 318, the service provider and/or the user. In some embodiments, the particular time value can vary according to one or more of network traffic, subscriber usage, subscriber account status, and the like.

Figure 4A:
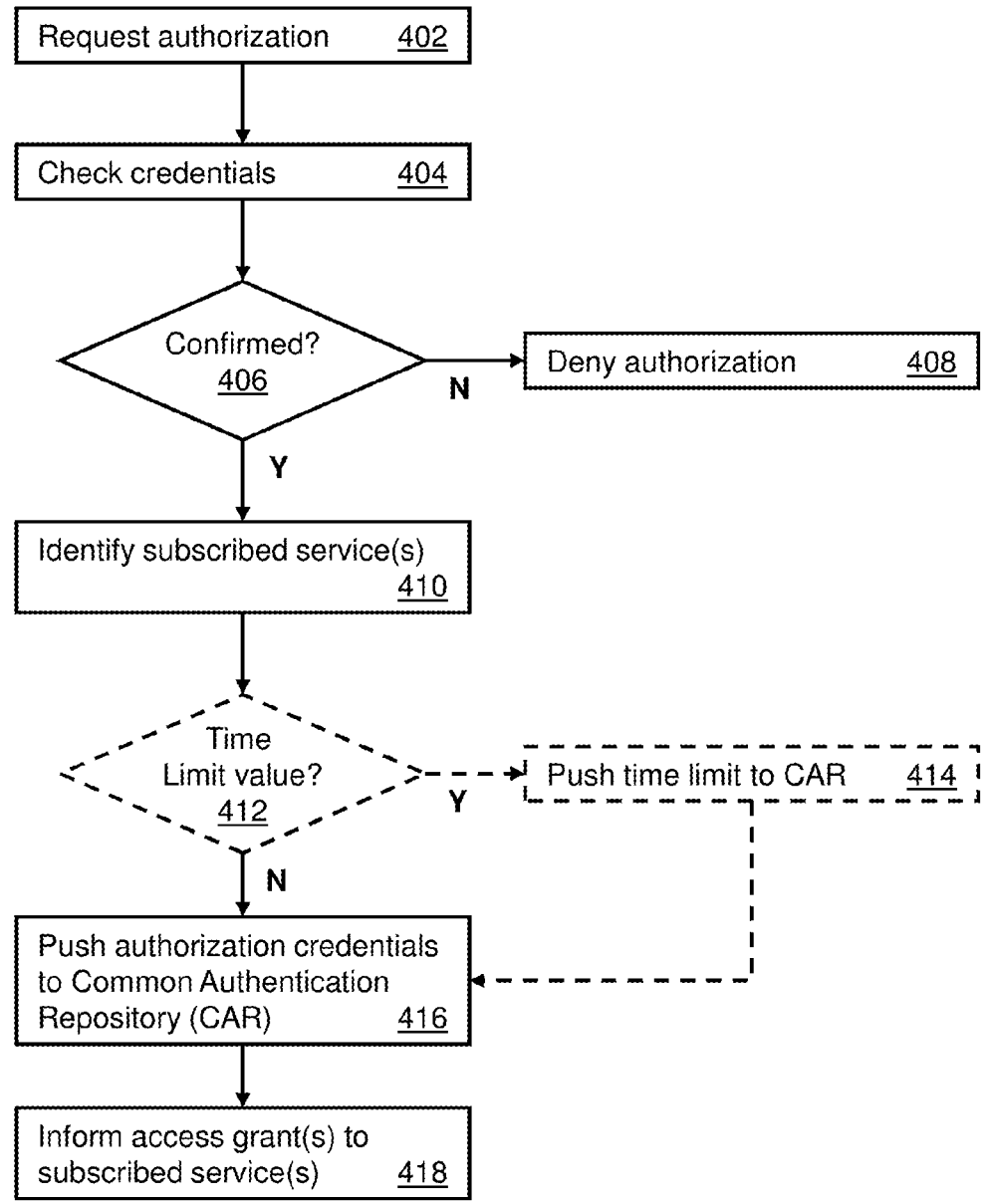
FIGS. 4A-4B are flowcharts illustrating procedures for authenticating a mobile device moving between networks, in accordance with embodiments of the disclosure.
Figure 4B:
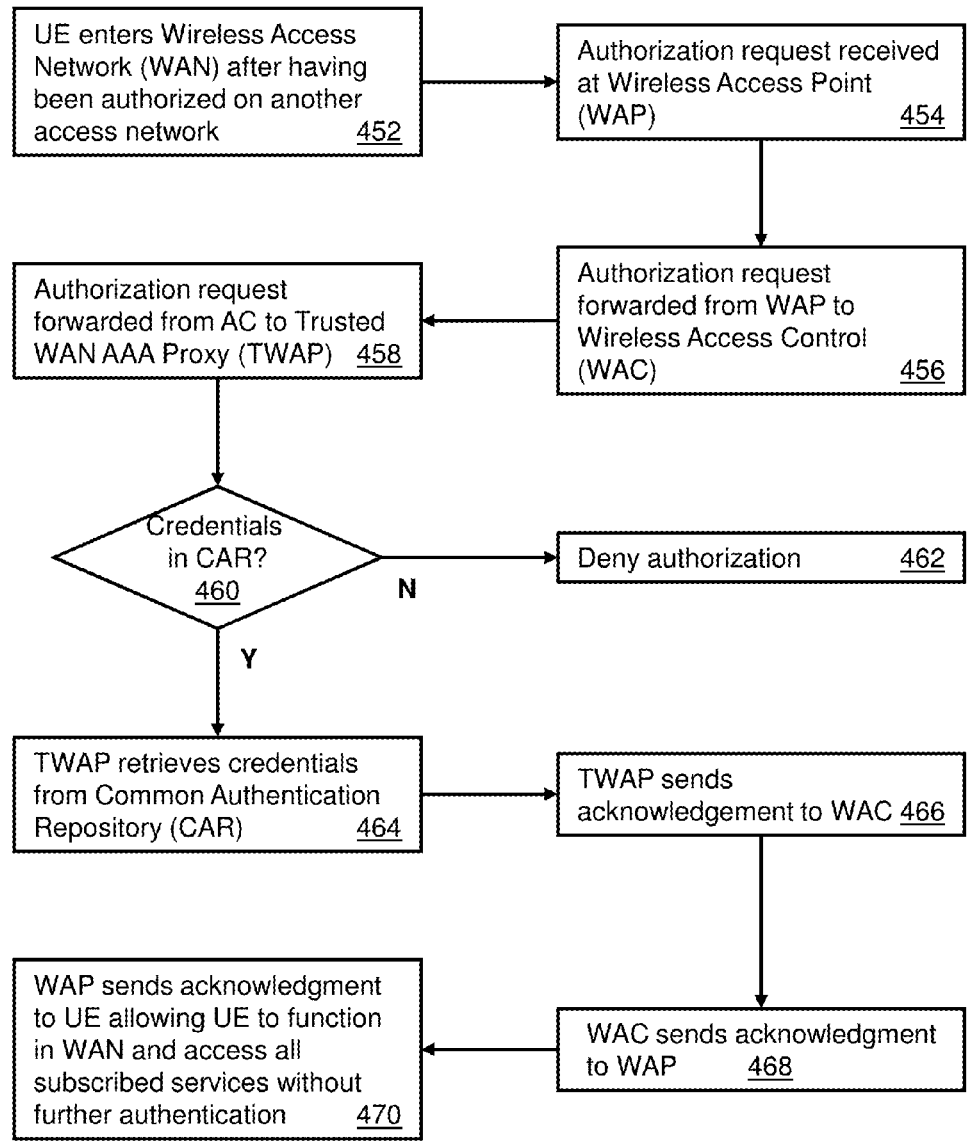

FIGS. 4A-4B are flowcharts illustrating procedures for authenticating a mobile device moving between networks, in accordance with embodiments of the disclosure. In a first process 400, a request authorization is determined at 402. The request can be initiated by a user device 330', and/or by an access terminal, e.g., an eNB 332 and/or the WAP 342, responding to discovery and/or attachment of the user device 330'. An authentication and/or authentication process is undertaken in response to the request. The process can obtain information automatically from the user device, e.g., from a SIM card of a mobile phone 330. Alternatively or in addition, the process can obtain information from the user. Such information can include, without limitation, a password, passphrase, biometric information, such as voice recognition, a fingerprint, eye scan, face scan, or the like.

Credentials associated with the authorization are checked at 404. This process can include comparing information to a stored record of the same. It is understood that encryption and/or other obfuscation techniques can be employed to one or more of the credentials and messages exchanging such information.

To the extent that the credentials are not successfully confirmed at 406, authorization is denied at 408. The checking and denial process may allow for retries. A number of authentication retries can be set to a threshold value. Upon exceeding the threshold number of retries, any attempts at future authentication can be blocked or otherwise prohibited. In such instances, a user may have to contact a service subscriber to reestablish their authentication and/or credentials and to reset the available number of retries.

the extent that the credentials are successfully confirmed at 406, subscribed services are identified at 410. A listing of subscribed services can be stored in a repository, such as a virtual intelligent repository 340 and/or a similar repository in the common cloud solution 318.

In some instances a time limit value is obtained or otherwise applied at 412. The time limit value can establish a time period during which an authentication remains valid, without regard to a network access status of the subscriber device. In some embodiments, this value can be pushed to the CAR 324 at 414. The CAR 324 can retain credentials for a time period based on the time limit value. For example, the CAR 324 can periodically determine whether a time limit value has been exceeded for a particular authenticated user. If so, the CAR records can be reset, purged, or otherwise inactivated to prevent access to subscribed services without a separate authentication.

It is understood that such a time limit can be applied or otherwise referenced to an initial authorization, e.g., remaining valued for a predetermined duration. Alternatively or in addition, the time limit can be applied or otherwise referenced to an access status. For example, the time period is referenced to a time at which a user terminates access, e.g., remaining available for some period of time, such as seconds, minutes, hours, days and the like. In some embodiments, the time period is relatively short, e.g., a few minutes or tens of minutes to accommodate situations in which a subscriber is transitioning to another access system. After the relatively short period has expired, the authorization credentials can be disabled, the presumption being that the subscriber has terminated access to subscribed services.

Having successfully confirmed the credentials at 406 and identified other subscribed services at 410, the authorization credentials to are pushed or otherwise provided to a repository, such as the CAR 324, at 416. The CAR 324, in turn, informs the subscribe services at 418 that access has been granted for the subscriber and/or subscriber device.

In a second process 450, the mobile device, or UE, enters a second access network at 452, such as a WAN 342 after having been authorized on a first access network, such as a 3GPP network 332. A new authorization is request received at the WAP 344, at 454. In some embodiments, the authorization request is generated by the WAP 344 in response to detecting a request for attachment by the UE.

The authorization request is forwarded, e.g., from the WAP 344 to a WAC 346 at 456. In response, an authorization request is forwarded from the WAC 344 to the TWAP 348 at 458. The TWAP 348 determines whether the user and/or the UE has already been authorized, e.g., by determining whether credentials already exist within the CAR 324 at 460. To the extent that the authorization credentials do not already exist, authorization can be denied at 462. In at least some embodiments, rather than denying authorization, the process reverts to an authentication process, e.g., as set forth above for the example authentication process 400.

TWAP retrieves credentials from Common Authentication Repository (CAR) at 464.

To the extent that the authorization credentials do already exist, the TWAP 348 sends an acknowledgement to the WAC 346 at 466. The WAC 346, in turn, sends an acknowledgment to the WAP at 468, and the WAP 344 sends an acknowledgment to the UE, allowing the UE to function within the WAN 342 and access all subscribed services at 470 without further authentication. Although the example processes 400, 450 refer to a 3GPP network 332 and a WiFi network 342, it is understood that they can be applied in a reverse order, e.g., initially authenticating on the WiFi network 342 and transferring to the 3GPP network 332. Likewise, it us understood that one or more of the processes 400, 450 can be applied to other access networks, including other IEEE 802.11 wireless networks, e.g., personal area networks, Bluetooth, and the like, wired networks, and so on.

While for purposes of simplicity of explanation, the respective processes are shown and described as a series of blocks in FIGS. 4A-4B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
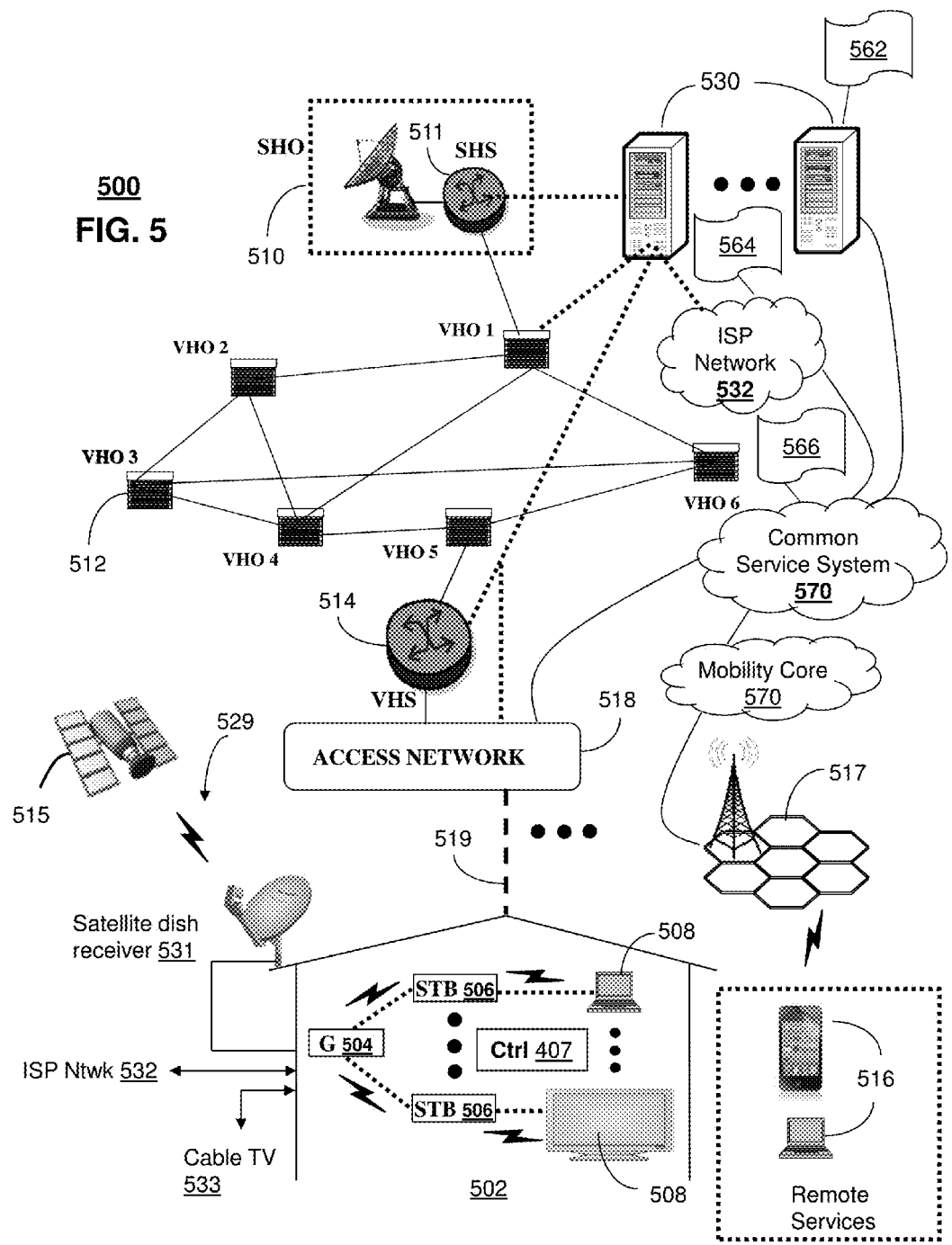
FIG. 5 depicts an illustrative embodiment of a communication system including a wireless communication network.

FIG. 5 depicts an illustrative embodiment of a first communication system 500 for delivering media content. The communication system 500 can represent an Internet Protocol Television (IPTV) media system. Communication system 500 can be overlaid or operably coupled with the systems 100, 200, 300 of FIGS. 1, 2 and/or 3 as another representative embodiment of communication system 500. For instance, one or more devices illustrated in the communication system 500 of FIG. 5 can determine a credential associated with a user device, e.g., a wireless communication device 516, responsive to authentication of the device 516 within a first communication network, e.g., a mobile cellular network. The credential corresponds to a first service to which the user is subscribed, such as the mobile cellular service. Authentication of the user and/or the user device is facilitated with respect to the first service to obtain a first authentication. A second service to which the user is subscribed, e.g., a cable service, a direct broadcast satellite service, a connected home service, and the like, is identified in response to the first authentication. A first notification is provided to an access control function of the second service, indicating that the user and/or the user device has been granted user access. The credential is stored, e.g., in a common authentication repository, such as the CAR 530, for all services to which the user is subscribed, including the first and second services.

In response to the user device requesting authentication within a second communication network, e.g., an IEEE 802.11 wireless network, such as a WiFi network, an inquiry is determined from the second communication network regarding authentication of the user and/or the user device within the second communication network. A second notification is provided to the second communication network that the user device has been authenticated within the first communication network, whereby the second communication network provides the user device with access to the services without further authentication being required. The user device accesses the services responsive to an acknowledgement from the second communication network that the user device has been authenticated to the second communication network.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the authentication system or server 530 to function as a common authentication repository (herein referred to as CAR 530). The system 500 can include an integrated network portion, e.g., as a common service system, or integrated cloud service 570. The common service system 570 can be in communication with one or more of a core network portion 570 of a mobility network that includes the base station 517, the access network 518, a direct broadcast satellite service providing service through the satellite dish receiver 531, an ISP network 532 and/or the CAR 530. The CAR 530 can use computing and communication technology to perform a function 562, which can include among other things, the authentication techniques described by one or more of at least portions of the processes 400, 450 of FIGS. 4A-4B. For instance, the function 562 of the CAR 530 can be similar to the functions described for the CAR 324 of FIG. 3, in accordance with the processes 400, 450 of FIGS. 4A-4B. The ISP network 562 and/or the common service system 570 can be provisioned with software functions 564 and 566, respectively, to utilize the services of the CAR 530. For instance, functions 564 and 566 of the ISP network 562 and/or the common service system 570 can be similar to the functions described for one or more of the devices of FIG. 3 in accordance with the processes 400, 450 of FIGS. 4A-4B.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
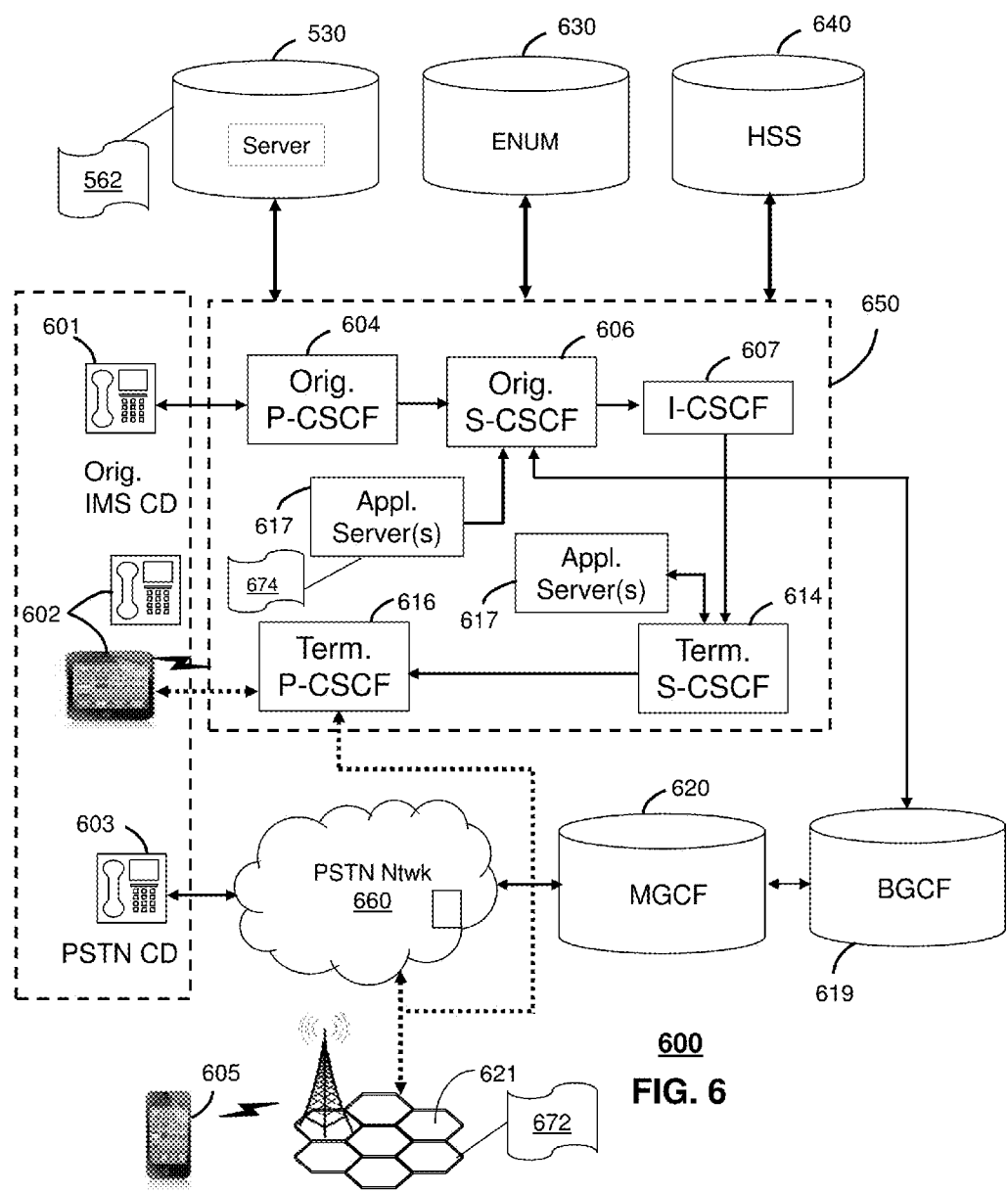
FIG. 6 depicts an illustrative embodiment of a communication system including telephone networks.

FIG. 6 depicts an illustrative embodiment of a communication system 600 employing an IP Multimedia Subsystem (IMS) network architecture to facilitate the combined services of circuit-switched and packet-switched systems. The communication system 500 can be overlaid or operably coupled with the system 100, 200, 300 of FIGS. 1, 2 and/or 3 and the communication system 500 as another representative embodiment of communication system 600. For instance, one or more devices illustrated in the communication system 600 of FIG. 6 can determine a credential associated with a user device, e.g., a wireless communication device 605, responsive to authentication of the device 605 within a first communication network, e.g., a mobile cellular network 621. The credential corresponds to a first service to which the user is subscribed, such as the mobile cellular service. Authentication of the user and/or the user device is facilitated with respect to the first service to obtain a first authentication. A second service to which the user is subscribed, e.g., a cable service, a direct broadcast satellite service, a connected home service, and the like, is identified in response to the first authentication. A first notification is provided to an access control function of the second service, indicating that the user and/or the user device has been granted user access. The credential is stored, e.g., in a common authentication repository, such as the CAR 530, for all services to which the user is subscribed, including the first and second services.

In response to the user device requesting authentication within a second communication network, e.g., a PSTN network 660, an inquiry is determined from the second communication network regarding authentication of the user and/or the user device within the second communication network. A second notification is provided to the second communication network that the user device has been authenticated within the first communication network, whereby the second communication network provides the user device with access to the services without further authentication being required. The user device accesses the services responsive to an acknowledgement from the second communication network that the user device has been authenticated to the second communication network.

The communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 400 of FIG. 4.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The authentication system, e.g., the CAR 530 of FIG. 5 can be operably coupled to the communication system 600 for purposes similar to those described above. The CAR 530 can perform function 562 and thereby provide authentication services to the CDs 601, 602, 603 and 605 of FIG. 6, similar to the functions described for the CAR 324 of FIG. 3 in accordance with the processes 400, 450 of FIGS. 4A-4B. The mobility network 621, which can be adapted with software to perform function 672 to utilize the services of the CAR 530, similar to the functions described for communication devices of FIG. 3 in accordance with at least portions of one or more of the processes 400, 450 of FIGS. 4A-4B. The CAR 530 can be an integral part of the application server(s) 617 performing function 674, which can be substantially similar to function 462 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
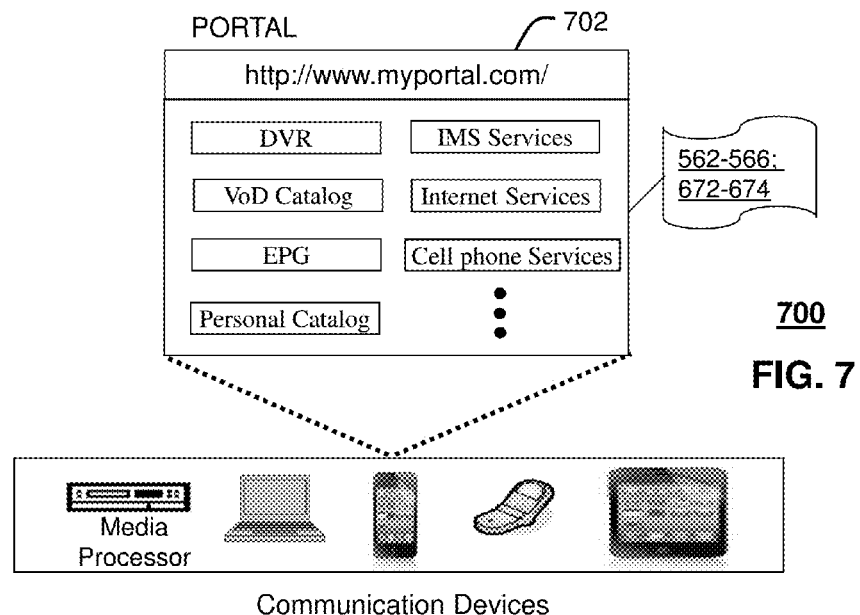
FIG. 7 depicts an illustrative embodiment of a web portal for interacting with the communication systems of FIGS. 1-3 and 6-7.

FIG. 7 depicts an illustrative embodiment of a web portal 702 of a communication system 700. The communication system 700 can be overlaid or operably coupled with the systems 100, 200, 300 of FIGS. 1, 3 and/or 3, the communication system 500, and/or the communication system 600 as another representative embodiment of the systems 100, 200, 300 of FIGS. 1, 2 and/or 3, communication system 400, and/or communication system 600. The web portal 702 can be used for managing services of systems 100, 200, 300 of FIGS. 1, 2 and/or 3 and the communication systems 500-600. A web page of the web portal 702 can be accessed by a Uniform Resource Locator (URL) with an Internet browser using an Internet-capable communication device such as those described in FIGS. 1, 2 and/or 3 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of the systems 100, 200, 300 of FIGS. 1, 2 and/or 3, and communication systems 500-600. For instance, users of the services provided by the CAR 324 or the CAR 530, such as service providers and/or subscribers, can log into their on-line accounts and provision the CARs 324, 530 with user credentials, time periods, information related to subscribed services, profiles, provide contact information to server to enable it to communication with devices described in FIGS. 1-3 and 5-6, and so on. Service providers can log onto an administrator account to provision, monitor and/or maintain the systems 100, 200, 300 of FIGS. 1, 2 and/or 3 or the CAR 530.

Figure 8:
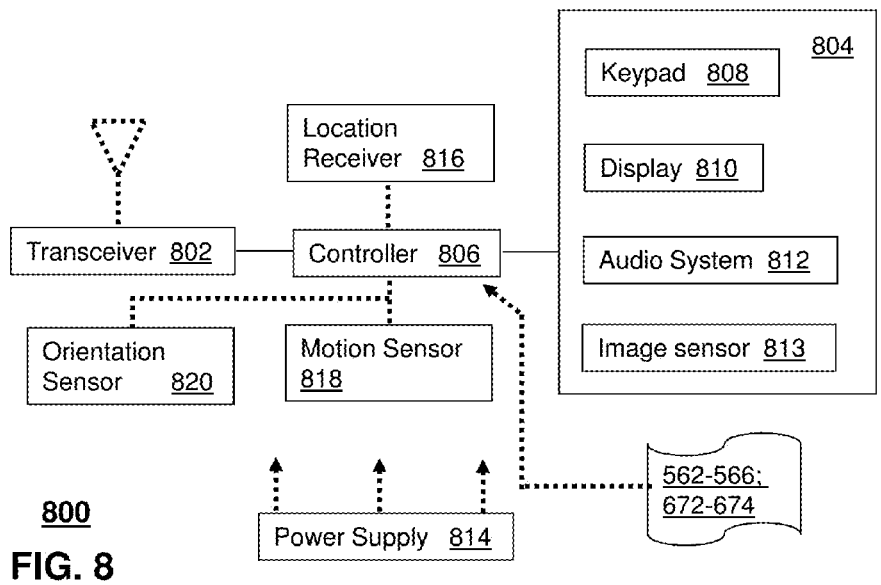
FIG. 8 depicts an illustrative embodiment of a communication device.

FIG. 8 depicts an illustrative embodiment of a communication device 800. The communication device 800 can serve in whole or in part as an illustrative embodiment of the devices depicted in FIGS. 1, 2 and/or 3, and FIGS. 5-6 and can be configured to perform portions of the processes 400, 450 of FIGS. 4A-4B.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of one or more of the devices of FIGS. 1, 2 and/or 3, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in the systems 100, 200, 300 of FIGS. 1, 2 and/or 3, communication systems 500-600 of FIGS. 5-6 such as a gaming console and a media player. In addition, the controller 806 can be adapted in various embodiments to perform one or more of the functions 562-566 and 672-674, respectively.

Upon reviewing the aforementioned embodiments, it would be evident to an artisan with ordinary skill in the art that said embodiments can be modified, reduced, or enhanced without departing from the scope of the claims described below. For example, the processes can be applied to applications, as well as services. Applications may be operated or otherwise provided by the same service provider, a different service provider, or a third party, such as app provider. Alternatively or in addition, at least some services can be provide by subscribers. For example, a peer-to-peer service can allow some users to subscribe to services of other users. Such services include, without limitation, sharing photos, videos, audio files, and the like. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
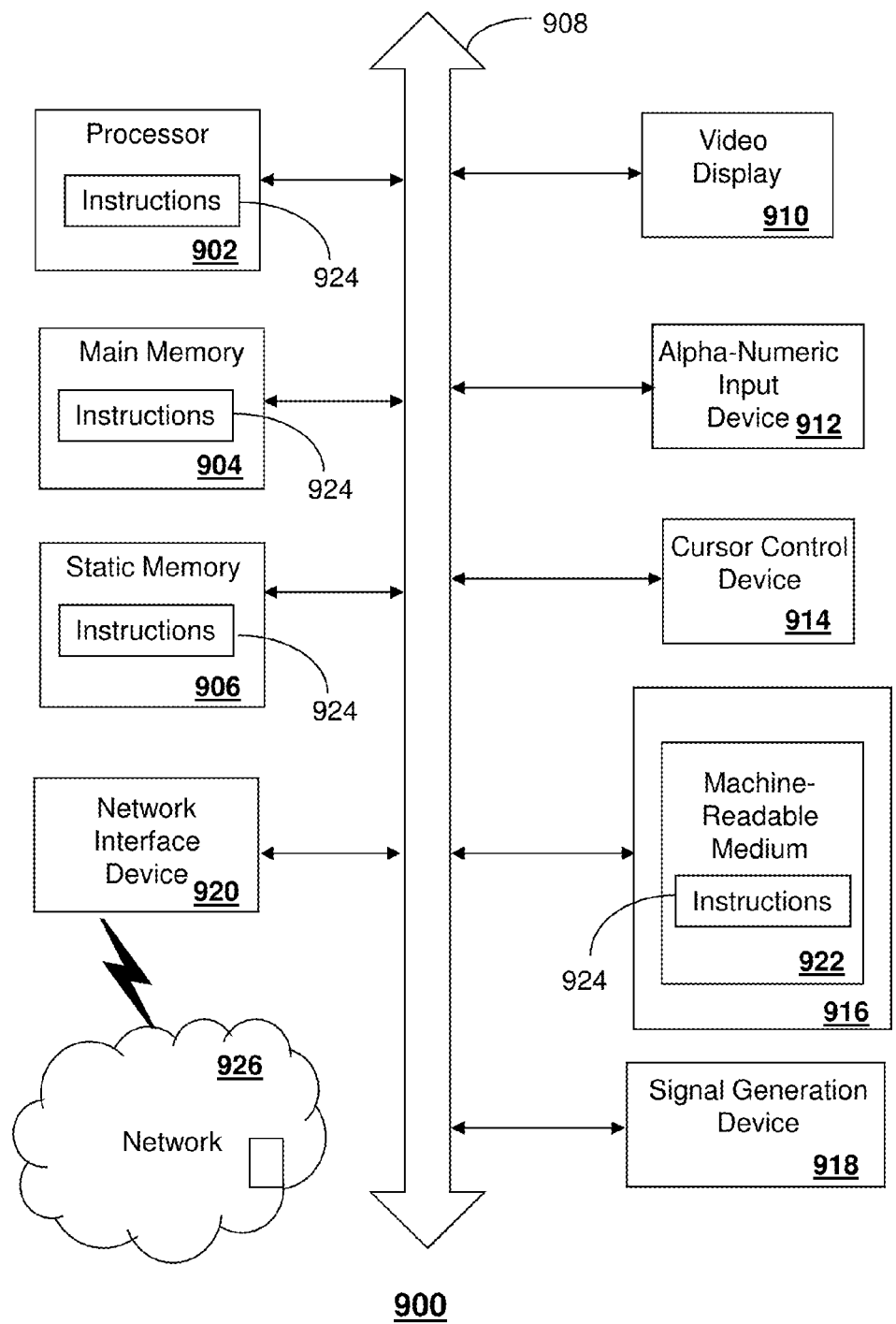
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the CAR 324, 530, the MME 336, the AAA 338, the VIR 340, the network/device manager 322, 312 the billing system 320, 310, the WAP 344, the WAC 346, the TWAP 348 and other devices of FIGS. 1-3 and 5-6. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processing system including a processor and responsive to authentication associated with a user device within a first communication network, a credential associated with the user device, the credential corresponding to a first service to which a user associated with the user device is subscribed;
initiating, by the processing system, the authentication associated with the user device with respect to the first service to obtain a first authentication, wherein the user device is granted user access to the first service based on the authentication;
identifying, by the processing system, a second service to which the user is subscribed in response to the first authentication;
forwarding, by the processing system, a first notification to an access control function of the second service that the user device is granted user access to the second service;
storing, by the processing system, the credential within a common authentication repository for a plurality of services comprising the first service and the second service; and
responsive to the user device requesting authentication within a second communication network:
transmitting, by the processing system, a second notification to a second communication network that the user device has been authenticated for a service of the plurality of services within the first communication network, whereby the second communication network provides the user device with access to the plurality of services without further authentication by the plurality of services being required, and
wherein the user device accesses a service of the plurality of services responsive to an acknowledgement from the second communication network that the user device has been authenticated to the second communication network.

2. The method of claim 1, wherein the first notification to the access control function of the second service comprises information regarding the plurality of services to which the user device has been granted the user access, and wherein the authentication is based on one of the user device, an identity of a user associated with the user device or any combination thereof.

3. The method of claim 2, wherein authentication to the first communication network or to the second communication network and access to the plurality of services is effective for a specified common period of time.

4. The method of claim 1, further comprising:
determining, by the processing system, usage data associated with the plurality of services utilized by the user device;
performing, by the processing system, billing procedures on behalf of the plurality of services in accordance with the usage data, thereby providing a common billing function for the plurality of services; and
storing, by the processing system, the usage data, thereby providing a common database for the plurality of services.

5. The method of claim 1, further comprising:
determining, by the processing system, an authentication time period;
detecting, by the processing system, an expiration of the authentication time period; and
forwarding a third notification to the access control function of the second service that the user access is terminated, responsive to the detecting of the expiration.

6. The method of claim 1, wherein the first communication network comprises a mobile cellular network and wherein the second communication network comprises an IEEE 802.11 wireless local area network.

7. The method of claim 1, wherein the plurality of services include a direct broadcast satellite service, a cable service, a connected home service, a connected car service an internet of things service, or any combination thereof.

8. A system comprising:
a processing system including a processor; and
a memory that stores executable instructions that, when executed by the processing system, facilitate performance of operations, comprising:
determining, responsive to authentication associated with a user device within a first communication network, a credential associated with the user device, the credential corresponding to a first service to which a user associated with the user device is subscribed;
facilitating authentication of the user device with respect to the first service to obtain a first authentication, wherein the user device is granted user access to the first service based on the authentication;
identifying a second service to which the user is subscribed in response to the first authentication;
providing a first notification to an access control function of the second service that the user device is granted user access to the second service;
storing the credential within a common authentication repository for a plurality of services comprising the first service and the second service; and
responsive to the user device requesting authentication within a second communication network:
providing a second notification to a second communication network that the user device has been authenticated for a service of the plurality of services within the first communication network, whereby the second communication network provides the user device with access to the plurality of services without further authentication by the plurality of services being required, and
wherein the user device accesses a service of the plurality of services responsive to an acknowledgement from the second communication network that the user device has been authenticated to the second communication network.

9. The system of claim 8, wherein the first notification to the access control function of the second service comprises information regarding the plurality of services to which the user device has been granted the user access.

10. The system of claim 9, wherein authentication to the first communication network or to the second communication network and access to the plurality of services is effective for a specified common period of time.

11. The system of claim 8, wherein the operations further comprise:
determining usage data associated with the plurality of services utilized by the user device;
performing billing procedures on behalf of the plurality of services in accordance with the usage data, thereby providing a common billing function for the plurality of services; and
storing, by the processing system, the usage data, thereby providing a common database for the plurality of services.

12. The system of claim 8, wherein the operations further comprise:

determining an authentication time period;
detecting an expiration of the authentication time period; and
forwarding a third notification to the access control function of the second service that the user access is terminated, responsive to the detecting of the expiration.

13. The system of claim 8, wherein the first communication network comprises a mobile cellular network and wherein the second communication network comprises an IEEE 802.11 wireless local area network.

14. The system of claim 8, wherein the plurality of services include a direct broadcast satellite service, a cable service, a connected home service, a connected car service an internet of things service, or any combination thereof.

15. A non-transitory, machine-readable storage medium comprising executable instructions that, when executed by a processing system including a processor, facilitate performance of operations, comprising:
determining, responsive to authentication associated with a user device within a first communication network, a credential associated with the user device, the credential corresponding to a first service to which a user associated with the user device is subscribed;
facilitating authentication of the user device with respect to the first service to obtain a first authentication, wherein the user device is granted user access to the first service based on the authentication;
determining a second service to which the user is subscribed in response to the first authentication;
providing a first notification to an access control function of the second service that the user device is granted user access to the second service;
facilitating storage of the credential, within a common authentication repository for a plurality of services comprising the first service and the second service; and
responsive to the user device requesting authentication within a second communication network:
providing a second notification to a second communication network that the user device has been authenticated for a service of the plurality of services within the first communication network, whereby the second communication network provides the user device with access to the plurality of services without further authentication by the plurality of services being required, and
wherein the user device accesses a service of the plurality of services responsive to an acknowledgement from the second communication network that the user device has been authenticated to the second communication network.

16. The non-transitory, machine-readable storage medium of claim 15, wherein the first notification to the access control function of the second service comprises information regarding the plurality of services to which the user device has been granted user access.

17. The non-transitory, machine-readable storage medium of claim 16, wherein authentication to the first communication network or to the second communication network and access to the plurality of services is effective for a specified common period of time.

18. The non-transitory, machine-readable storage medium of claim 15, wherein the operations further comprise:
determining usage data associated with the plurality of services utilized by the user device;

performing billing procedures on behalf of the plurality of services in accordance with the usage data, thereby providing a common billing function for the plurality of services; and storing the usage data, thereby providing a common database for the plurality of services.

19. The non-transitory, machine-readable storage medium of claim 15, wherein the operations further comprise:

determining an authentication time period;

detecting an expiration of the authentication time period; and forwarding a third notification to the access control function of the second service that the user access is terminated, responsive to the detecting of the expiration.

20. The non-transitory, machine-readable storage medium of claim 15, wherein the plurality of services include a direct broadcast satellite service, a cable service, a connected home service, a connected car service an internet of things service, or any combination thereof.

\* \* \* \* \*